United States Patent [19]
Janocko

[11] Patent Number: 4,990,054
[45] Date of Patent: Feb. 5, 1991

[54] DEVICE INCORPORATING MICRO-POROUS MEMBRANE FOR VENTING GASES FROM SEAL ASSEMBLY OF A REACTOR COOLANT PUMP

[75] Inventor: David J. Janocko, Forest Hills, Pa.

[73] Assignee: Westinghouse Electric Corp., Pittsburgh, Pa.

[21] Appl. No.: 450,354

[22] Filed: Dec. 13, 1989

[51] Int. Cl.⁵ .................. F01D 11/00; F03B 11/00
[52] U.S. Cl. ...................... 415/111; 415/169.1; 415/170.1; 415/230; 277/23; 277/29; 417/423.11; 55/159; 55/203
[58] Field of Search .............. 415/170.1, 229, 230, 415/231, 121.1, 169.1, 143, 110, 111, 112; 55/159, 203; 277/15, 23, 29, 81 R; 417/423.11

[56] References Cited
U.S. PATENT DOCUMENTS

| | | | |
|---|---|---|---|
| 3,077,161 | 2/1963 | Allen | 103/87 |
| 3,426,690 | 2/1969 | Cattabiani | 103/87 |
| 3,652,179 | 3/1972 | Hagen | 415/111 |
| 3,680,976 | 8/1972 | Buse | 415/110 |
| 3,854,907 | 12/1974 | Rising | 55/159 |
| 3,896,004 | 7/1975 | Rodgers | 202/167 |
| 4,008,017 | 2/1977 | Hennig et al. | 418/129 |
| 4,021,136 | 5/1977 | Sabino, Jr. | 415/111 |
| 4,256,436 | 3/1981 | Fandrey et al. | 415/143 |
| 4,273,562 | 6/1981 | Niskanen | 415/143 |
| 4,276,170 | 6/1981 | Vaillancourt | 210/436 |
| 4,320,001 | 3/1982 | Le Boeuf | 210/120 |
| 4,427,421 | 1/1984 | Jensen et al. | 55/203 |
| 4,769,209 | 9/1988 | Tower et al. | 376/402 |
| 4,792,278 | 12/1988 | Emerson | 415/143 |
| 4,936,744 | 6/1990 | Dosgh et al. | 415/143 |

Primary Examiner—Edward K. Look
Assistant Examiner—Hoang Nguyen

[57] ABSTRACT

A pump has a stationary seal housing with pressurized liquid and gas therein, a rotatable shaft disposed through the housing and operable for centrifugally producing rotation of the liquid within the housing, and a seal assembly disposed between the housing and rotatable shaft. The pump employs a device for venting from the housing to the exterior thereof the gas released from the liquid in the housing, such as by a drop in the pressure thereof, while blocking escape of the liquid therefrom. The venting device includes a body in the form of an externally threaded plug threadably mounted into an internally threaded bore in the seal housing, a flow facilitating passageway defined through the plug, extending between, and having respective entry and exit openings at, the respective inner and outer sides of the plug for providing communication between the interior and exterior of the seal housing, and a micro-porous membrane mounted to the plug across the entry opening of the passage for permitting gas flow while blocking liquid flow therethrough.

17 Claims, 3 Drawing Sheets

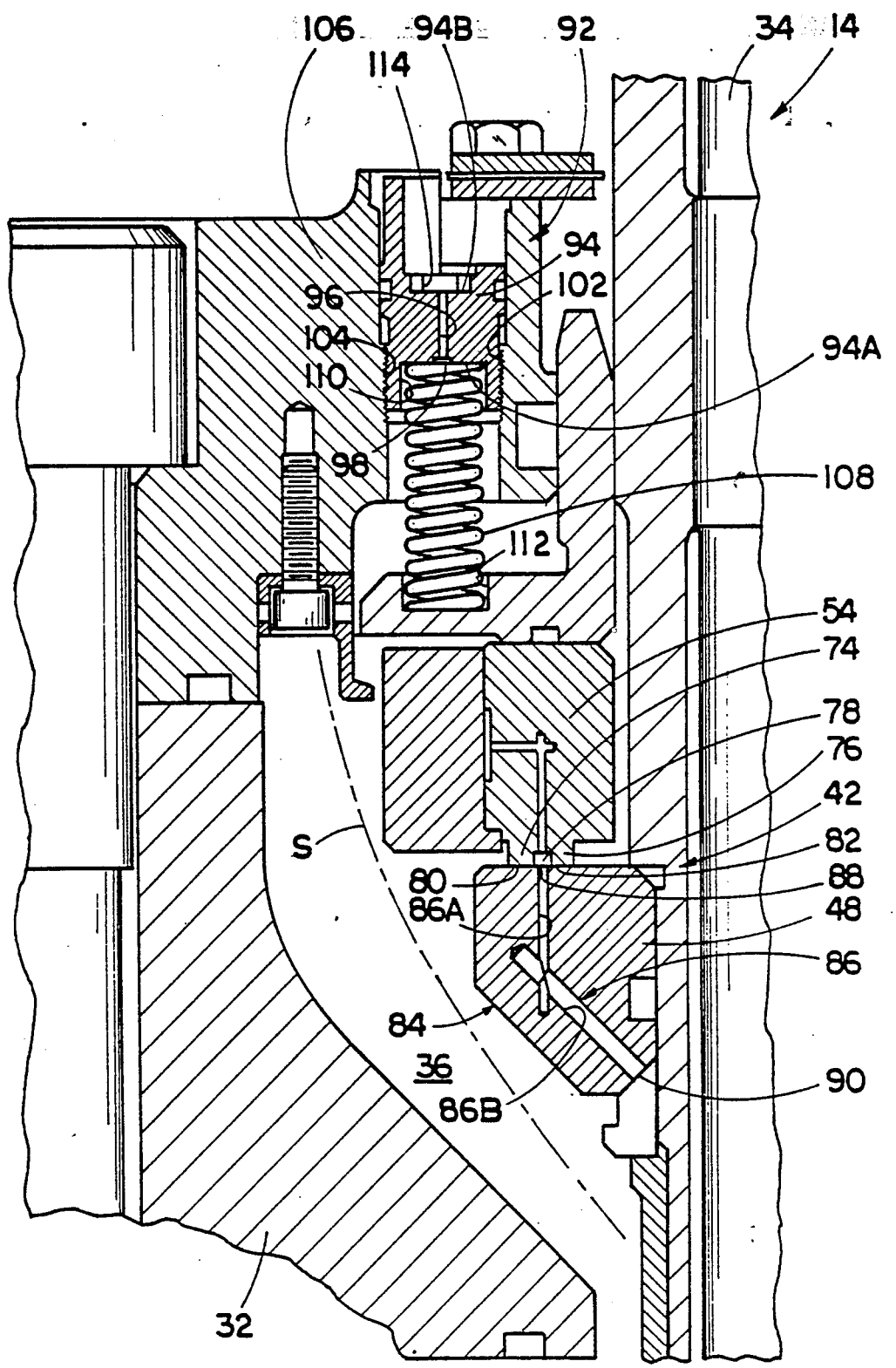

DEVICE INCORPORATING MICRO-POROUS MEMBRANE FOR VENTING GASES FROM SEAL ASSEMBLY OF A REACTOR COOLANT PUMP

CROSS REFERENCE TO RELATED APPLICATIONS

Reference is hereby made to the following applications dealing with related subject matter and assigned to the assignee of the present invention:
1. "Sealing Devices For The Drive Shaft Of A High Pressure Fluid Pump" by N. Bonhomme, assigned U.S. Ser. No. 379,196 and filed May 17, 1982.
2. "Nuclear Reactor Coolant Pump Impeller/Shaft Assembly" by L. S. Jenkins, assigned U.S. Ser. No. 761,447 and filed Aug. 1, 1985.
3. "Improved Shaft Seal" by K. P. Quinn, assigned U.S. Ser. No. 739,745 and filed May 31, 1985.
4. "Reactor Coolant Pump Hydrostatic Sealing Assembly With Improved Hydraulic Balance" by R. F. Guardiani et al, assigned U.S. Ser. No. 063,331 and filed June 17, 1987.
5. "Reactor Coolant Pump Sealing Surface With Titanium Nitride Coating" by G. Zottola et al, assigned U.S. Ser. No. 035,832 and filed Apr. 8, 1987.
6. "Reactor Coolant Pump Hydrostatic Sealing Assembly With Externally Pressurized Hydraulic Balance Chamber" by C. P. Nyilas et al, assigned U.S. Ser. No. 091,224 and filed Aug. 31, 1987.
7. "Reactor Coolant Pump Shaft Seal Utilizing Shape Memory Metal" by D. J. Janocko, assigned U.S. Ser. No. 197,174 and filed May 23, 1988.
8. "Reactor Coolant Pump Auxiliary Seal For Reactor Coolant System Vacuum Degasification" by J. D. Fornoff, assigned U.S. Ser. No. 222,649 and filed July 21, 1988.
9. "Reactor Coolant Pump Having Double Dam Seal With Self-Contained Injection Pump Mechanism" by D. J. Janocko, assigned U.S. Ser. No. 231,039 and filed Aug. 12, 1988.
10. "Reactor Coolant Pump Auxiliary Flexible Vacuum Seal For Reactor Coolant System Vacuum Degasification" by C. D. Bice et al, assigned U.S. Ser. No. 294,331 and filed 1-6-89.
11. "Reactor Coolant Pump Having Improved Dynamic Secondary Seal Assembly" by C. D. Bice et al, assigned U.S. Ser. No. 468,316 and filed 1-22-90.
12. "Reactor Coolant Pump Having Thermally Stabilized Hydrostatic Sealing Assembly" by C. D. Bice, assigned U.S. Ser. No. 466,143 and filed 1-16-90.

BACKGROUND OF THE INVENTION

1. Field of the Invention

The present invention relates generally to shaft seals and, more particularly, is concerned with a device incorporating a micro-porous membrane for venting gases from a seal assembly of a reactor coolant pump used in a nuclear power plant.

2. Description of the Prior Art

In pressurized water nuclear power plants, a reactor coolant system is used to transport heat from the reactor core to steam generators for the production of steam. The steam is then used to drive a turbine generator. The reactor coolant system includes a plurality of separate cooling loops, each connected to the reactor core and containing a steam generator and a reactor coolant pump.

The reactor coolant pump typically is a vertical, single stage, centrifugal pump designed to move large volumes of reactor coolant at high temperatures and pressures, for example 550 degrees F. and 2500 psi. The pump basically includes three general sections from bottom to top—hydraulic, shaft seal and motor sections. The lower hydraulic section includes an impeller mounted on the lower end of a pump shaft which is operable within the pump casing to pump reactor coolant about the respective loop. The upper motor section includes a motor which is coupled to drive the pump shaft. The middle shaft seal section includes three tandem sealing assemblies—lower primary, middle secondary and upper tertiary sealing assemblies. The sealing assemblies are located concentric to, and near the top end of, the pump shaft. Their combined purpose is to mechanically contain the high positive pressure coolant of the reactor coolant system from leakage along the pump shaft to the containment atmosphere during normal operating condition. Representative examples of pump shaft sealing assemblies known in the prior art are the ones disclosed in U.S. Pat. Nos. to MacCrum (3,522,948), Singleton (3,529,838), Villasor (3,632,117), Andrews et al (3,720,222) and Boes (4,275,891) and in the first three patent applications cross-referenced above, all of which are assigned to the same assignee as the present invention.

The lower primary sealing assembly (or No. 1 seal), the main seal of the pump, is a controlled-leakage film-riding face seal. Its primary components are a runner which rotates with the pump shaft and a non-rotating seal ring which is attached to the housing of the lower seal assembly. The No. 1 seal causes a pressure drop of the coolant from about 2250 psi to 30 psi across its face and allows a flow rate of about 2–3 gpm therethrough. The low-pressure coolant leaking through the No. 1 seal flows up the shaft annulus to the region of the middle secondary sealing assembly.

The middle secondary sealing assembly (or No. 2 seal) is a rubbing face-type seal. Its primary components are a rotating runner and a non-rotating ring. Most of the coolant from the No. 1 seal is diverted by the No. 2 seal out through the No. 1 seal leakoff. However, a portion of the coolant passes through the No. 2 seal, leaking at a flow rate of about 2 gph at a pressure drop of from 30 psi to 3–7 psi. The lower pressure coolant leaking through the No. 2 seal flows further up the shaft annulus to the region of the upper tertiary sealing assembly.

The upper tertiary sealing assembly (or No. 3 seal) is also a rubbing face-type seal, its primary components being a rotating runner and a non-rotating ring. Most of the coolant flow leaking from the No. 2 seal is diverted by the No. 3 seal out through the No. 2 seal leakoff. However, a small portion of the coolant passes through the No. 3 seal.

In one form, the No. 3 seal has a double face or dam with two concentric sealing faces. Coolant is injected into the annulus between the two faces or dams such that one portion of the injected coolant flow goes back outward past the outer or upstream one of the seal dams into the housing cavity between the No. 2 and No. 3 seals and then out the No. 2 seal leakoff, while another portion of the injected coolant flow goes in the opposite direction inward past the inner or downstream one of the seal dams and ultimately through the No. 3 seal leakoff to the containment atmosphere.

A centrifugal pump in the form of flow passages incorporated in the rotating runner of the No. 3 seal act to feed coolant to the annulus between the seal dams. Each passage has an inlet located on a smaller radius of rotation relative to the shaft axis than an outlet of the passage. Rotation of the runner causes a pressure differential in the reactor coolant flowing within and along the passages due to centrifugal effects.

The reactor coolant is comprised primarily of water. The coolant water contains dissolved boron, which is used as a moderator in the nuclear reaction, and corrosion inhibitors. Dissolved gases may also be present in the coolant water either added intentionally to control water chemistry or as residual amounts from fluid processing. As the coolant water passes through the above-described Nos. 1, 2 and 3 seals and undergoes the associated drops in pressure and absorbs heat from friction, dissolved gases tend to come out of solution and are released in the form of small bubbles. These bubbles can collect in high spots in the seal housing which may not be adequately vented due to the elevation and radial location of the leakoff port relative to the free surface generated by the fluid rotating within the seal housing. The venting of gases may also be aggravated by trap regions which may have been formed in the layout and design of connecting system piping.

Excessive accumulation of gases can detrimentally affect seal performance. If the free surface of coolant water does not cover the inlet of a seal, its function may be hampered by inadequate cooling and lubrication or decreased leakage. In the case of the No. 3 seal incorporating passages in its rotating runner which act as a centrifugal pump, the collection of gases can cause additional problems If gases accumulate to a point which does not permit access of coolant water to the pumping passage inlets, the gases will supplant the coolant water in the passages and drastically reduce the head developed through centrifugal action.

Consequently, a need exists for an approach to venting the seal housing of the reactor coolant pump so as to avoid the potential deleterious effects which can arise from accumulation of gases released from the coolant water due to the drop in pressure thereof in the pump.

SUMMARY OF THE INVENTION

The present invention provides a venting device designed to satisfy the aforementioned needs. The venting device of the present invention incorporates a microporous membrane which permits the passage of gases and vapors from a high pressure to a low pressure area while retaining the liquid, such as coolant water. The membrane is advantageously applied in conjunction with a passage or port which communicates from a region of the interior of the pump seal housing where gases tend to accumulate to the exterior of the housing.

Accordingly, the present invention is set forth in a pump having a stationary seal housing with a pressurized liquid and gas therein, a rotatable member disposed in the housing and operable for causing rotation of the liquid within the housing, and a seal assembly disposed within the housing between the housing and rotatable member. The present invention is directed to a gas venting device which comprises: (a) a body having spaced inner and outer sides and being mountable to the seal housing so as to dispose the inner and outer sides of the body respectively adjacent to, and in communication with, the interior and exterior of the seal housing; (b) means defined through the body for facilitating flow of liquid and gas from the interior to exterior of the seal housing; and (c) means mounted on the body for permitting flow of gas from the interior to the exterior of the housing through the flow facilitating means while blocking flow of liquid therethrough from the interior to the exterior of the housing.

More particularly, the body is an externally threaded plug being threadably mountable into an internally threaded bore in the seal housing The flow facilitating means is a passageway defined through the plug. The passageway extends between, and has respective entry and exit openings at, the respective inner and outer sides of the plug for providing communication between the interior and exterior of the seal housing. The gas flow permitting and liquid flow blocking means is a microporous membrane mounted to the plug at one or the other of the entry and exit openings of the passageway.

These and other features and advantages of the present invention will become apparent to those skilled in the art upon a reading of the following detailed description when taken in conjunction with the drawings wherein there is shown and described an illustrative embodiment of the invention.

BRIEF DESCRIPTION OF THE DRAWINGS

In the course of the following detailed description, reference will be made to the attached drawings in which:

FIG. 3 is an enlarged axial sectional view of the seal housing and upper tertiary sealing assembly of the reactor coolant pump of FIG. 2.

DETAILED DESCRIPTION OF THE INVENTION

Figure 1:
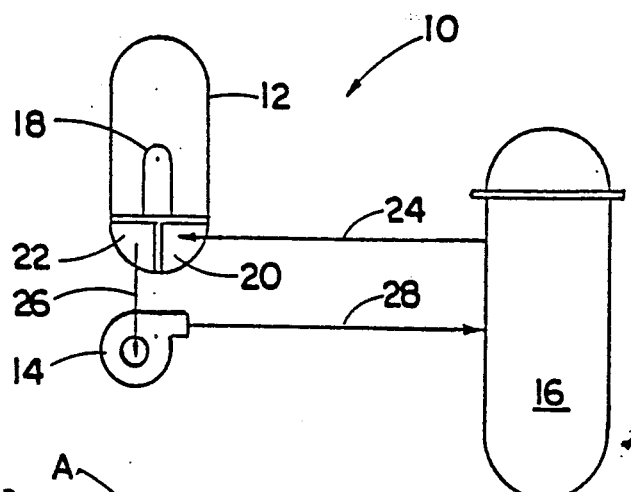
FIG. 1 is a schematic representation of one cooling loop of a conventional nuclear reactor coolant system which includes a steam generator and a reactor coolant pump connected in series in a closed coolant flow circuit with the reactor core.

In the following description, like reference characters designate like or corresponding parts throughout the several views Also in the following description, it is to be understood that such terms as "forward", "rearward", "left", "right", "upwardly", "downwardly", and the like, are words of convenience and are not to be construed as limiting terms.

Prior Art Reactor Coolant Pump

Referring now to the drawings, and particularly to FIG. 1, there is shown a schematic representation of one of a plurality of cooling loops 10 of a conventional nuclear reactor coolant system. The cooling loop 10 includes a steam generator 12 and a reactor coolant pump 14 serially connected in a closed coolant flow circuit with a nuclear reactor core 16. The steam generator 12 includes primary tubes 18 communicating with inlet and outlet plenums 20,22 of the generator. The inlet plenum 20 of the steam generator 12 is connected in flow communication with the outlet of the reactor core 16 for receiving hot coolant therefrom along flow path 24 of the closed flow circuit. The outlet plenum 22 of the steam generator 12 is connected in flow communication with an inlet suction side of the reactor coolant pump 14 along flow path 26 of the closed flow circuit. The outlet pressure side of the reactor coolant pump 14 is connected in flow communication with the inlet of the reactor core 16 for feeding cold coolant thereto along flow path 28 of the closed flow circuit.

In brief, the coolant pump 14 pumps the coolant under high pressure about the closed flow circuit. Particularly, hot coolant emanating from the reactor core 16 is conducted to the inlet plenum 20 of the steam generator 12 and to the primary tubes 18 in communication therewith. While in the primary tubes 18, the hot coolant flows in heat exchange relationship with cool feedwater supplied to the steam generator 12 via conventional means (not shown). The feedwater is heated and portions thereof changed to steam for use in driving a turbine generator (not shown). The coolant, whose temperature has been reduced by the heat exchange, is then recirculated to the reactor core 16 via the coolant pump 14.

The reactor coolant pump 14 must be capable of moving large volumes of reactor coolant at high temperatures and pressures about the closed flow circuit. Although, the temperature of the coolant flowing from the steam generator 12 to the pump 14 after heat exchange has been cooled substantially below the temperature of the coolant flowing to the steam generator 12 from the reactor core 16 before heat exchange, its temperature is still relatively high, being typically about 550 degrees F. The coolant pressure produced by the pump is typically about 2500 psi.

Figure 2:
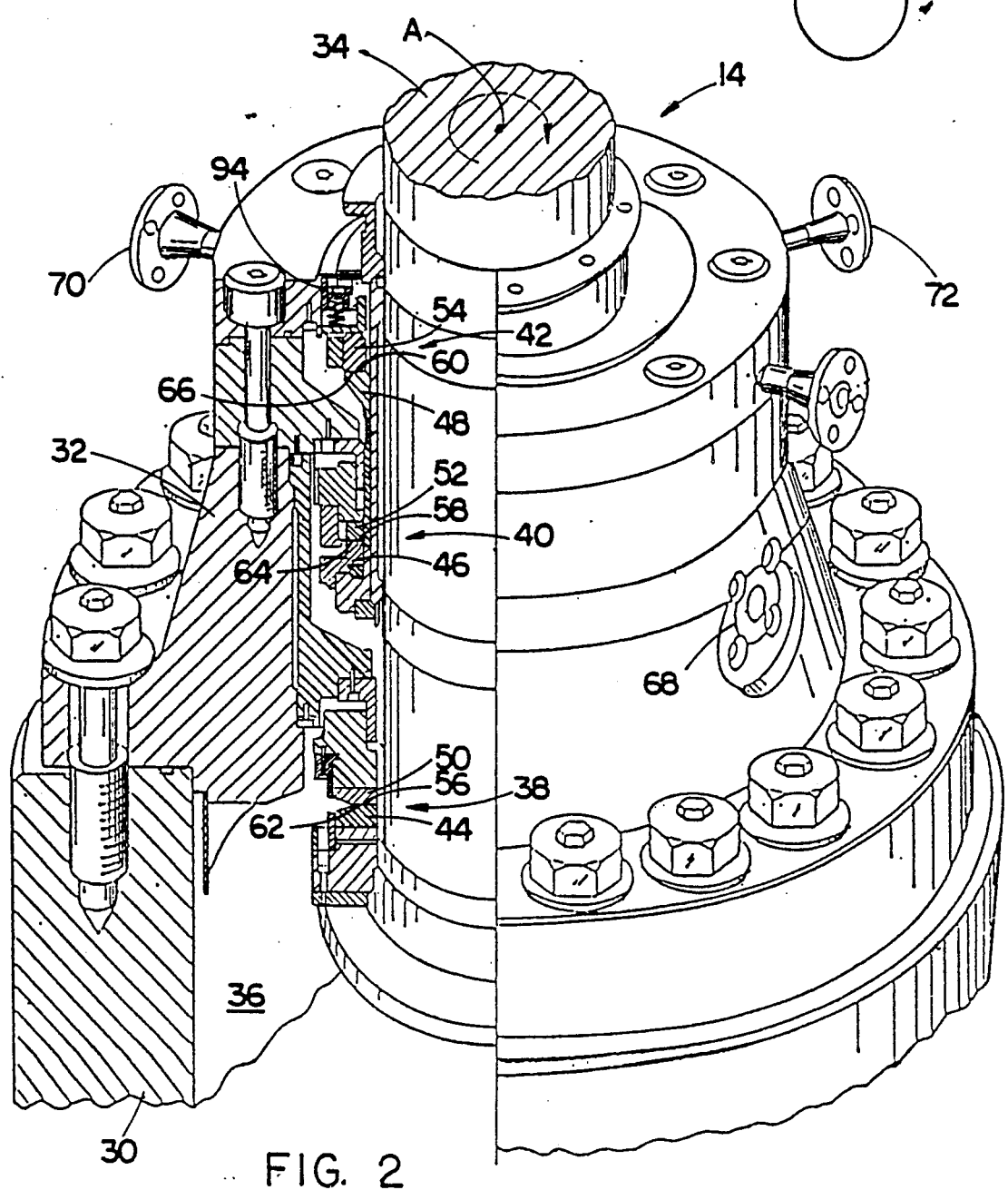
FIG. 2 is a fragmentary cutaway perspective view of the reactor coolant pump which can employ a gas venting device in accordance with the present invention, a seal section of the pump being illustrated in cross-section which includes a seal housing and lower primary, middle secondary and upper tertiary sealing assemblies which are disposed within the seal housing and surround a shaft of the pump.
Figure 5:
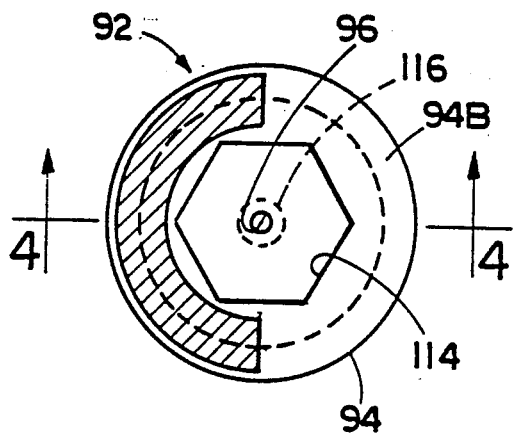
FIG. 5 is a top plan view, partially in cross-section, of the venting device as seen along line 5—5 of FIG. 4.
Figure 4:
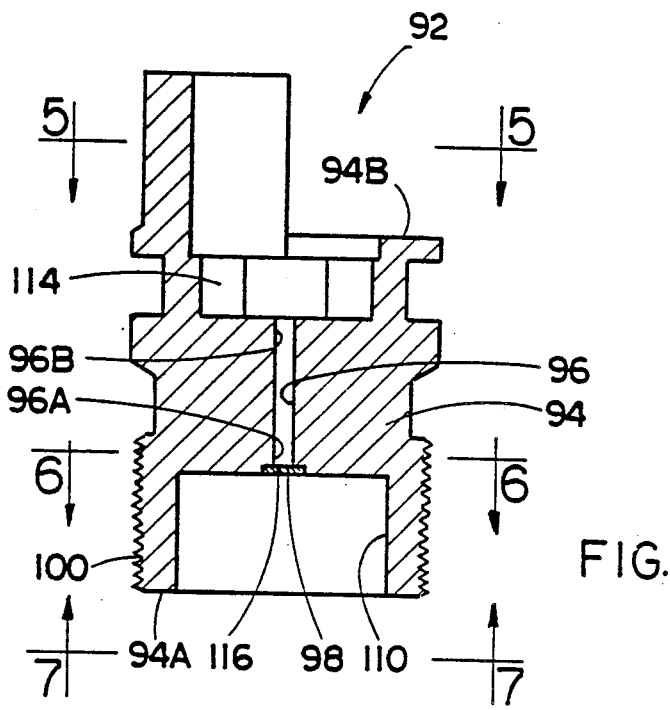
FIG. 4 is an enlarged axial sectional view of the venting device of the present invention seen associated with the tertiary sealing assembly in FIG. 3 and as taken along line 4—4 of FIG. 5.
Figure 7:
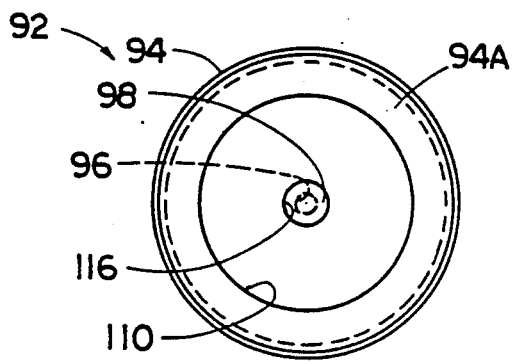
FIG. 7 is a bottom plan view of the venting device as seen along line 7—7 of FIG. 4.
Figure 6:
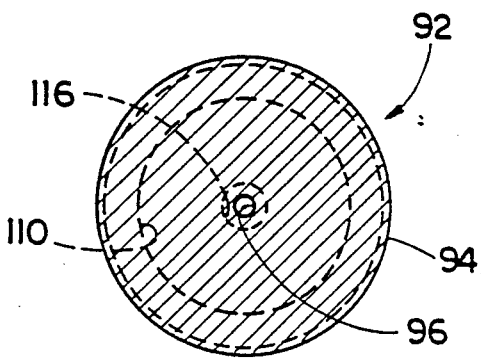
FIG. 6 is a cross-sectional view of the venting device taken along line 6—6 of FIG. 4.

As seen in FIG. 2, the prior art reactor coolant pump 14 generally includes a pump housing 30 which terminates at one end in a seal housing 32. The pump 14 also includes a pump shaft 34 extending centrally of the housing 30 and being sealingly and rotatably mounted within the seal housing 32. Although not shown, the bottom portion of the pump shaft 34 is connected to an impeller, while a top portion thereof is connected to a high-horsepower, induction-type electric motor. When the motor rotates the shaft 34, the impeller within the interior 36 of the housing 30 circulates the coolant flowing through the pump housing 30 at pressures from ambient to approximately 2500 psi cover gas. This pressurized coolant applies an upwardly directed, hydrostatic load upon the shaft 34 since the outer portion of the seal housing 32 is surrounded by the ambient atmosphere.

In order that the pump shaft 34 might rotate freely within the seal housing 32 while maintaining the 2500 psi pressure boundary between the housing interior 36 and the outside of the seal housing 32, tandemly-arranged lower primary, middle secondary, and upper tertiary sealing assemblies 38,40,42 are provided in the positions illustrated in FIG. 2 about the pump shaft 34 and within the pump housing 30. The lower primary sealing assembly 38 which performs most of the pressure sealing (approximately 2250 psi) is of the non-contacting hydrostatic type, whereas the middle secondary and upper tertiary sealing assemblies 40,42 are of the contacting or rubbing mechanical type.

Each of the sealing assemblies 38,40,42 of the pump 14 generally includes a respective annular runner 44,46,48 which is mounted to the pump shaft 34 for rotation therewith and a respective annular seal ring 50,52,54 which is stationarily mounted within the seal housing 32. The respective runners 44,46,48 and seal rings 50,52,54 have top and bottom end surfaces 56,58,60 and 62,64,66 which face one another. The facing surfaces 56,62 of the runner 44 and seal ring 50 of the lower primary sealing assembly 38 normally do not contact one another but instead a film of fluid normally flows between them. On the other hand, the facing surfaces 58,64 and 60,66 of the runners and seal rings 46,52 and 48,54 of the middle secondary and upper tertiary sealing assemblies 40 and 42 normally contact or rub against one another.

Because the primary sealing assembly 38 normally operates in a film-riding mode, some provision must be made for handling coolant fluid which "leaks off" in the annular space between the seal housing 32 and the shaft 34 rotatably mounted thereto. Accordingly, the seal housing 32 includes a primary leakoff port 68, whereas leakoff port 70 accommodates coolant fluid leakoff from the secondary sealing assembly 40 and leakoff port 72 accommodates coolant fluid leakoff from the tertiary sealing assembly 42.

The lower primary sealing assembly 38 (or No. 1 seal), the main seal of the pump, causes a pressure drop of coolant fluid from about 2250 psi to 30 psi across its face and allows a flow rate of about 2-3 gpm therethrough. The low-pressure coolant fluid leaking through the lower primary sealing assembly 38 flows up the shaft annulus to the region of the middle secondary sealing assembly 40. At the secondary sealing assembly 40 (or No. 2 seal), most of the coolant fluid from the primary sealing assembly 38 is diverted to the primary leakoff port 68. However, a portion of the fluid passes through the secondary sealing assembly 40, leaking at a flow rate of about 2 gph at a pressure drop of from 30 psi to 3-7 psi. The still lower pressure coolant fluid leaking through the secondary sealing assembly 40 flows further up the shaft annulus to the region of the upper tertiary sealing assembly 42. At the upper tertiary sealing assembly 42 (or No. 3 seal), most of the flow leaking from the secondary sealing assembly 40 is diverted by the tertiary sealing assembly 42 out through the secondary seal leakoff port 70.

Referring now to FIG. 3, it will be seen that the upper tertiary sealing assembly 42 has a pair of radially spaced annular outer and inner dams 74,76 on the bottom surface 66 of the seal ring 54 facing the top surface 60 of the runner 48. The pair of dams 74,76 define an annular-shaped seal annulus 78 therebetween. The double dams 74,76 project toward the top surface 60 of the runner 48 and have respective annular faces 80,82 on their noses being capable of contacting the top surface 60 on the runner 48.

The lower runner 48 of the upper tertiary sealing assembly 42 has a self-contained injection pump mechanism 84 which is adapted to pressurized the annulus 78 between the double dams 74,76 on the seal ring 54 of the tertiary sealing assembly 42 with reactor coolant. More particularly, the injection pump mechanism 84 is a flow passage 86 incorporated in the rotating runner 48 of the tertiary sealing assembly 42. The flow passage 86, composed of two branches 86A,86B, has an outlet 88 at one end in communication with the double dam seal annulus 78 and an inlet 90 at the opposite end in communication with reactor coolant within the seal housing 32 of the pump 14. The passage inlet 90 is located on a smaller radius of rotation relative to the rotational axis A of the pump shaft 34 (FIG. 2) than the passage outlet 88. Because of this relationship between the locations of the inlet 90 and outlet 88, rotation of the runner 48 which rotatably moves the passage therewith turns the passage 86 and rotating runner 48 into a centrifugal pump, causing a pressure differential in the coolant flowing within and along the passage 86 due to centrifugal effects. Thus, the outlet 88 of the passage 86 feeds the annulus 78 between the noses of the double dams 74,76, providing coolant at a pressure above that at the inlet 90 to the passage 86.

Venting Device Incorporating Micro-Porous Membrane

From the above description, it can be understood that the lower, middle and upper sealing assemblies 38,40,42 function to stepdown the pressure of the coolant within the seal housing 32. The drop in pressure of the portions of the coolant passing through the seals and the heating of the coolant due to seal friction causes gases dissolved in the coolant to come out of solution and be released within the seal housing 32. The pressure drop is largest at the lower primary sealing assembly 38 and thus the largest quantity of gases are released by the coolant leakage through the lower sealing assembly 38. The bulk of these released gases exit at the primary leakoff port 68 with the substantial portion of the coolant leakage from the primary sealing assembly 38.

Primarily, accumulation of the released gases within regions of the seal housing 32 tends to be a problem more so between the middle and upper sealing assemblies 40,42 than between the lower and middle sealing assemblies 38,40. The pressure of the coolant leakage between the middle and upper sealing assemblies is substantially lower than between the lower and middle sealing assemblies 38,40, for instance 3-7 psi compared to 30 psi, causing more gases to be released. The centrifugal forces cause the heavier coolant liquid to rotatably flow about the outside diameter of the seal housing 32 producing an interior free liquid surface S, approximately as shown in FIG. 3, which blocks the lighter released gases from access to the middle or secondary leakoff port 70 and pushes the released gases upwardly and inwardly toward the shaft axis A. Released gases accumulate in the passages 86 of the rotating runner 48 of the upper sealing assembly 42 disrupting its function as the centrifugal pump mechanism 84. The released gases supplant the coolant liquid in the passages 86 and drastically reduce the head developed through centrifugal action. The annulus 78 between the dams 74,76 of the upper sealing assembly 42 becomes starved of liquid and thus of lubrication for the rubbing faces 80,82 and 66.

Referring to FIGS. 3-7, the venting device of the present invention, generally designated 92, substantially alleviates the released gas accumulation problem in the region of the upper tertiary sealing assembly 42. The venting device 92 provides an avenue for venting of the released gases which is not blocked by the interior free surface S of the coolant liquid rotating in the seal housing 32 between the middle and upper sealing assemblies 40,42.

More particularly, the venting device 92 includes a body 94 in the form of a plug having spaced inner and outer sides 94A,94B, a passageway 96 defined through the plug 94 between the inner and outer sides 94A,94B thereof, and a micro-porous membrane 98. The plug 94 preferably has external threads 100 by which the plug 94 is removably and sealably mounted to the seal housing 32 via internal threads 102 formed within a bore 104 in an end closure 106 of the seal housing 32. The bore 104 extends and provides communication between the interior and exterior of the seal housing 32 in the region of the upper tertiary sealing assembly 42.

The plug 94 per se, without the passageway 96 and membrane 98, was used prior to the present invention in the seal housing 32, functioning as an externally adjustable gland. A coil spring 108 seated in recesses 110,112 formed in the plug inner side 94A and non-rotational ring 54 imposes a preload on the ring 54 of the upper sealing assembly 42 which can be varied by rotatably adjusting the position of the plug 94. A tool socket 114 is formed on the outer side 94B of the plug 94 for that purpose. The plug 94 still serves that original function and now by incorporating the passageway 96 and membrane 98 can perform the additional gas venting function of the present invention. It should be understood, however, that the passageway 96 and membrane 98 could be located at some other position on the seal housing 32 to carryout the gas venting function.

The passageway 96 of the venting device 92 is a vent port defined through the plug 94 by means of which the coolant liquid and gas released from the liquid can flow from the interior to the exterior of the end closure 106 of the seal housing 32. The vent port 96 has respective entry and exit openings 96A, 96B at the respective inner and outer sides 94A,94B of the plug 94 for providing communication between the interior and exterior of the seal housing 32.

The micro-porous membrane 98 of the venting device 92 has a construction which permits passage of gas flow while blocking passage of liquid flow through the membrane and thus through the passageway 96. The membrane 98 can be mounted to the plug 94 at either one or the other of the entry and exit openings 96A,96B of the passageway 96. Preferably, the membrane 98 is mounted to the plug 96 across the entry opening 96A of the passageway 96 and, specifically, in a recess 116 defined at the entry opening 96A of the passageway 96. The membrane 98 is attached to the surface of the plug 94 within the recess 116 by any suitable means, such as an adhesive material There are several commercially-available products which are suitable to use as the micro-porous membrane 98. One is an expanded polytetrafluoroethylene (PTFE) material sold under the trademark GORE-TEX by W. L. Gore & Associates, Inc., specified as follows: X10638 nonwoven polyester/1 micron membrane/adhesive. Another material is a polymer membrane sold under the trademark MicroTec by MicroPore Inc.

It is thought that the present invention and many of its attendant advantages will be understood from the foregoing description and it will be apparent that various changes may be made in the form, construction and arrangement of the parts thereof without departing from the spirit and scope of the invention or sacrificing all of its material advantages, the form hereinbefore described being merely a preferred or exemplary embodiment thereof.

I claim:

1. For use in a pump having a stationary seal housing with pressurized liquid and gas therein, a rotatable member disposed in the housing and operable for causing rotation of the liquid within the housing, and a seal assembly disposed within the housing between the housing and rotatable member, a gas venting device comprising:
   (a) a body having spaced inner and outer sides and being mountable to the seal housing so as to dispose said inner and outer sides of said body respectively adjacent to, and in communication with, the interior and exterior of the seal housing;
   (b) means defined through said body for facilitating flow of the liquid and gas from the interior to exterior of the seal housing; and
   (c) means mounted on said body for permitting flow of gas from the interior to the exterior of the housing through said flow facilitating means while blocking flow of liquid therethrough from the interior to the exterior of the housing.

2. The device as recited in claim 1, wherein said gas flow permitting and liquid flow blocking means is a micro-porous membrane.

3. The device as recited in claim 1, wherein said body is an externally threaded plug being threadably mountable into an internally threaded bore in the seal housing.

4. The device as recited in claim 1, wherein said flow facilitating means is a passageway defined through said body extending between, and having respective entry and exit openings at, said respective inner and outer sides of said body for providing communication between the interior and exterior of the seal housing.

5. The device as recited in claim 4, wherein said gas flow permitting and liquid flow blocking means is a micro-porous membrane mounted to said body across one or the other of said entry and exit openings of said passageway for permitting gas flow while blocking liquid flow therethrough.

6. The device as recited in claim 5, wherein said micro-porous membrane is mounted to said body across said entry opening of said passageway.

7. The device as recited in claim 6, wherein said body has a recess defined at said entry opening of said passageway, said membrane being mounted within said recess.

8. For use in a pump having a stationary seal housing with pressurized liquid and gas therein, a rotatable member disposed in the housing and operable for causing rotation of the liquid within the housing, and a seal assembly disposed within the housing between the housing and rotatable member, a gas venting device comprising:
   (a) a body having spaced inner and outer surfaces and being mountable to the seal housing so as to dispose said inner and outer surfaces of said body respectively adjacent to, and in communication with, the interior and exterior of the seal housing, said body being in the form of an externally threaded plug being threadably mountable into an internally threaded bore in the seal housing;
   (b) means defining a passageway through said body extending between, and having respective entry and exit openings at, said respective inner and outer surfaces of said body for providing communication between the interior and exterior of the seal housing; and
   (c) a micro-porous membrane mounted at one or the other of said surfaces of said body across a corresponding one or the other of said entry and exit openings of said passageway for permitting flow of gases from the interior to the exterior of the housing through said passageway while blocking flow of the liquid therethrough.

9. The device as recited in claim 8, wherein said micro-porous membrane is mounted to said body across said entry opening of said passageway.

10. The device as recited in claim 9, wherein said body has a recess defined at said entry opening of said passageway, said membrane being mounted within said recess.

11. In a pump having a stationary seal housing with pressurized liquid and gas therein, a rotatable member disposed in said housing and operable for causing rotation of said liquid within said housing, and a seal assembly disposed within the housing between said housing and rotatable member, a gas venting device comprising:
   (a) a body having spaced inner and outer sides and being mounted to the seal housing so as to dispose said inner and outer sides of said body respectively adjacent to, and in communication with, the interior and exterior of the seal housing;
   (b) means defined through said body for facilitating flow of the liquid and gas from the interior to exterior of the seal housing; and
   (c) means mounted on said body for permitting flow of gas from the interior to the exterior of the housing through said flow facilitating means while blocking flow of liquid therethrough from the interior to the exterior of the housing.

12. The device as recited in claim 11, wherein said gas flow permitting and liquid flow blocking means is a micro-porous membrane.

13. The device as recited in claim 11, wherein said body is an externally threaded plug being threadably mounted into an internally threaded bore in the seal housing.

14. The device as recited in claim 13, wherein said flow facilitating means is a passageway defined through said plug extending between, and having respective entry and exit openings at, said respective inner and outer sides of said plug for providing communication between the interior and exterior of the seal housing.

15. The device as recited in claim 14, wherein said gas flow permitting and liquid flow blocking means is a micro-porous membrane mounted to said plug across one or the other of said entry and exit openings of said passageway for permitting gas flow while blocking liquid flow therethrough.

16. The device as recited in claim 15, wherein said micro-porous membrane is mounted to said plug across said entry opening of said passageway.

17. The device as recited in claim 16, wherein said plug has a recess defined at said entry opening of said passageway, said membrane being mounted within said recess.

* * * * *